March 12, 1935.  I. C. HARRIS  1,993,740
TOOL JOINT
Original Filed April 7, 1930
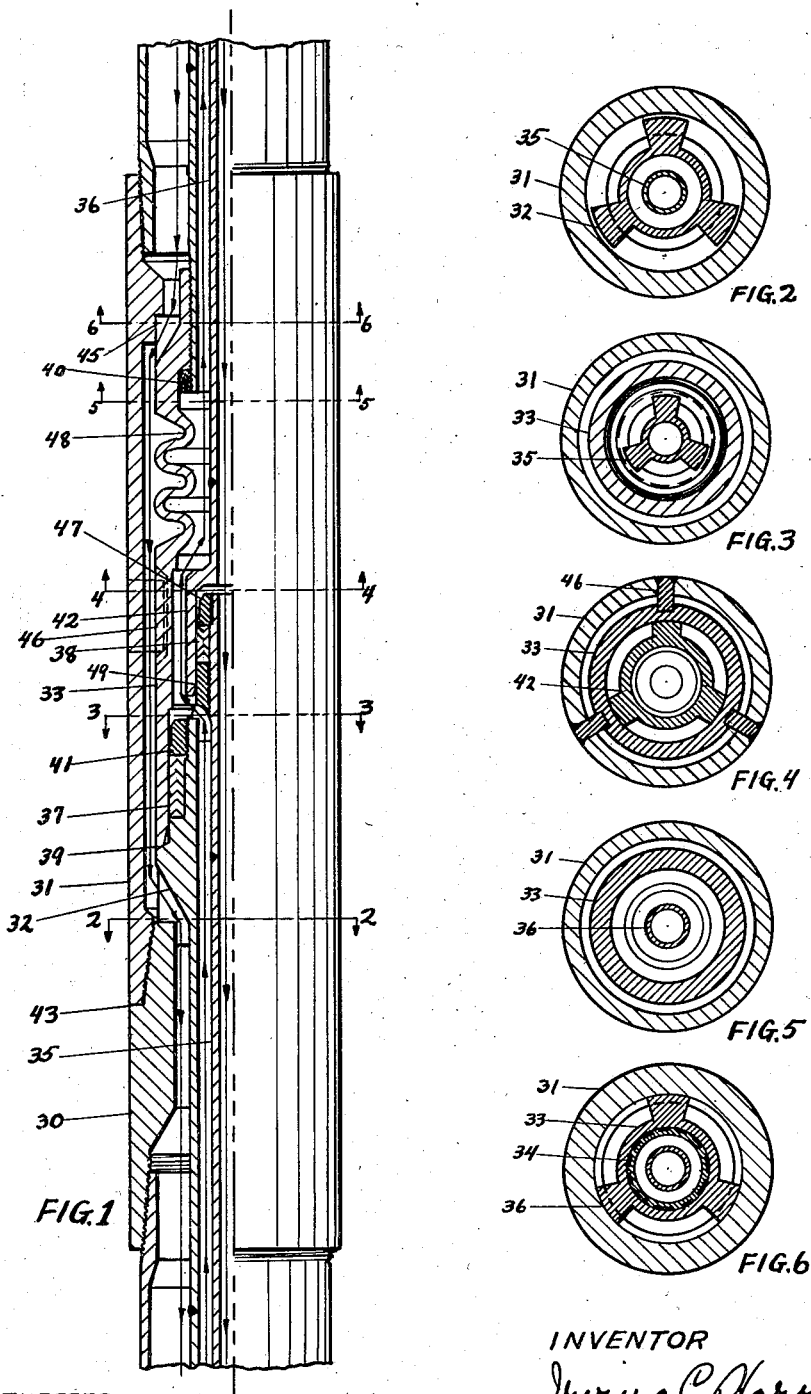
INVENTOR
Irving C Harris
WITNESSES Patented Mar. 12, 1935

1,993,740

UNITED STATES PATENT OFFICE 1,993,740

TOOL JOINT

Irving C. Harris, Los Angeles, Calif.

Original application April 7, 1930, Serial No. 442,289. Divided and this application January 24, 1931, Serial No. 511,101

9 Claims. (Cl. 285—22)

This invention relates to tool-joints which are specially adapted for use in connecting together the sections of drill-pipe and other parts used in deep well drilling operations, such as described in my application, Serial Number 381,328, filed July 26, 1929, and my application, Serial Number 442,289, filed April 7, 1930, of which the present application is a companion.

In carrying on operations according to the method described in the above mentioned applications, it is desirable to use a string of drill-pipe having three passageways, or conduits, for the conveyance of fluid, and so constructed and assembled in sections that the sections may be very quickly joined together in a manner such that the companion conduits for fluid will be individually connected through the joints without leakage from one conduit to another and with the certainty that each conduit will always be connected with its proper companion.

It is an object of this invention to provide a tool-joint by means of which a string of drill-pipe comprising three tubes, or pipes, may be made up in sections of convenient length for handling, and so constructed and assembled that the sections may be connected together or disconnected very quickly.

Another object is to provide a means of joining the sections of drill-pipe which will insure the joints between the companion tubes forming the several passageways being fluid-tight against leakage from one passageway to another, or from the outermost to the space outside.

Another object is to provide a means of connecting together the sections of drill-pipe that will make it impossible to make an incorrect mating of the three passageways.

Another object is to provide a means of connecting together sections of drill-pipe in which leakage of fluid from one conduit to another through the joints in the tool-joints may be prevented by metal-to-metal seals that may be made fluid-tight without the use of packing.

Another object is to provide a tool-joint using metal-to-metal seals to prevent leakage through the joints which seals are so constructed that they will have a flexibility which will insure correct seating and prevent displacement by distorsion of the tool-joint under stresses imposed in use.

With the foregoing objects in view, together with such other objects and advantages as may subsequently appear, the invention resides in part, in the construction, combination, and arrangement of parts and their equivalents, hereinafter described and claimed and illustrated by way of example in the accompanying drawing, in which:

Fig. 1 is a view of the tool-joint as seen in side elevation and axial section.

Fig. 2 is a view of the tool-joint as seen in cross-section at right angles to the axis and at the elevation indicated by the section line 2—2 in Fig. 1, and looking downward.

Fig. 3 is a view of the tool-joint as seen in cross section at right angles to the axis and at the elevation indicated by the cross section line 3—3 in Fig. 1 and looking downward.

Fig. 4 is a view of the tool-joint as seen in cross section at right angles to the axis and at the elevation indicated by the section line 4—4 in Fig. 1 and looking upward.

Fig. 5 is a view of the tool-joint as seen in cross section at right angles to the axis and at the elevation indicated by the cross section line 5—5 in Fig. 1 and looking upward.

Fig. 6 is a view of the tool-joint as seen in cross-section at right angles to the axis and at the elevation indicated by the cross section line 6—6 in Fig. 1.

The details of construction are quite fully disclosed in the drawing; and the courses of the fluids in their passage through the joints are indicated by arrows. In the specific embodiment shown, the fluid flowing in the outermost conduit has the highest pressure, the fluid flowing in the intermediate conduit the lowest pressure, and the fluid flowing in the innermost conduit a pressure always, normally higher than in the intermediate conduit.

The tool-joint is divided into two units, a lower and an upper; and the two units are mates, or companions, that meet along a parting that may be observed from the following description. The lower unit is comprised of the parts designated in the drawing by the numerals 35, 32, 30, 37, 41, 38 and 47. In the drawing, parts 30, 32 and 35 are tubular in general form, with connecting webs of metal centering and supporting the tubular elements in proper relationship with each other. The space between parts 30 and 32, annular in form, except where interrupted by the webs supporting 32 within 30, forms the outermost conduit through the lower unit of the tool-joint. The space between parts 32 and 35, annular in form, except where interrupted by the webs of metal supporting 35 within 32, forms the intermediate conduit through the lower unit of the tool-joint. The bore through the center of 35 forms the innermost conduit.

The three parts, 30, 32 and 35 may be of separate pieces of metal nested together, as shown; or they may be made with 30 and 32 of one piece of metal and 35 of a separate piece; or they may be made up in any other way without departing from the essentials of the invention. Each of the three parts, 30, 32 and 35 is provided with means of attachment, by threading, welding or any other means, to the corresponding member of the drill-pipe section or other associated structure at one end and with a mating construction at the other to suit its respective companion member of the upper unit of the tool-joint.

The upper unit of the tool-joint is comprised of the parts designated as 31, 33 and 42. In the drawing, parts 31, 33 and 42 are tubular in general form, with connecting webs of metal centering and supporting the tubular elements in proper relationship with each other. The space between 31 and 33, annular in form, except where interrupted by the webs of metal supporting 33 within 31, forms the outermost conduit through the upper unit of the tool-joint. The space between 33 and 42, annular in form, except where interrupted by the webs of metal supporting 42 within 33, forms the intermediate conduit though the upper unit of the tool-joint. The bore through the center of 42 forms the innermost conduit through the upper unit of the tool-joint.

The three parts, 31, 33 and 42 may be of separate pieces of metal nested together, as shown; or they may be formed from one piece, or in any combination, by machining or welding, without departing from the essentials of the invention. Each of the three parts is provided with a means of attachment, by threading, welding, or any other means, to the corresponding member of the drill-pipe section or other associated structure at one end and a mating construction to suit the respective companion member of the lower unit of the tool-joint at the other end.

The two units of the tool-joint are connected to each other by means of a threaded, tapered joint and a pair of mating, annular shoulders, indicated at 43, formed between parts 30 and 31; and the said shoulders constitute a metal-to-metal joint which may be made fluid-tight against leakage of fluid from the outermost conduit to the space outside of the tool-joint.

In the drawing, parts 32 and 33 meet in the form of a pair of mating, annular shoulders, indicated at 39, constituting a metal to metal joint which may be made fluid-tight against leakage of fluid from the outermost conduit into the intermediate conduit. The packing, 37, held in place by retaining ring 41, is auxiliary to the metal-to-metal joint at 39 and will stop any leakage that may pass the metal-to-metal joint, thus providing a double-seal tending to prevent the high pressure fluid in the outermost conduit from passing into the intermediate conduit though the joint between the two members 32 and 33. The same packing, also, provides a means of preventing fluid from the outermost conduit entering the intermediate conduit when the two units of the tool-joint are being separated under conditions where the outermost conduit contains fluid that must be drained out by separating the two units far enough for the fluid to drain out through the joint between the shoulders at 43 while the packing 38 is in contact and effective in preventing leakage into the intermediate conduit.

In the drawing, a part of 33 is indicated in cross-section as having a corrugated construction providing a bellowslike expansion-joint, the bottom of one corrugation being indicated at 48. The object of this construction is to provide in member 33 a measure of flexibility and capacity to lengthen or shorten under stress, which is assisted by keys 46 which assist in centering and supporting 33, they being somewhat loosely seated in slots in 33. The mating of the two units of the tool-joint is proportioned so that 32 and 33 come together at 39 slightly before the two shoulders at 43 meet in screwing together the two units, the flexibility and the capacity to lengthen or shorten under stress, provided by the corrugated construction of member 33, providing the necessary compensation to allow the shoulders at 43 to come to a proper seating. This is an important feature claimed for this invention.

Attention is called to the fact, also, that the area of the circle, with the axis of the tool-joint as a center, where 32 and 33 come to a fluid-tight seat at 39 is greater than the area of the circle, with the axis of the tool-joint as a center, at the bottom of the corrugation indicated at 48, and that the excess of the pressure of the fluid in the outermost conduit over the pressure in the intermediate conduit will act upon the difference in the areas of these two circles in a manner tending to press the two members 32 and 33 together at 39 in proportion to the difference in the two pressures named, the effect of the pressures upon the corrugations being balanced, leaving the difference as stated effective in pressing the two parts together. It will be seen that, the greater the difference in pressure, the greater the contact pressure of the two shoulders at 39; and this is as it should be to oppose any leakage through the joint. The construction shown provides what is in effect a check valve with a metal-to-metal, or ground, seat to prevent leakage through the joint between the two members, 32 and 33.

It is obvious that leakage through the joint between 35 and 42 could be prevented by a construction like that at 39, using a metal-to-metal joint in the place of the packing 38 as shown, and that a construction providing the necessary flexibility could be provided by a corrugated section operating on the same principle as shown for member 33.

Having described and illustrated this specific embodiment, it is pointed out that the construction illustrated will fulfill the stated objects of the invention. It is quite obvious that it will be impossible to make an incorrect mating of the conduits, and that the two units may be connected to each other or disconnected very quickly, all of the parts that coact in connecting and rendering fluid-tight against leakage the companion members forming the three conduits through the tool-joint being brought into proper position by the simple act of entering the telescoping sleeves one within the other and screwing up the threaded, tapered joint until the pair of shoulders are brought together at 43, or the reverse in disconnecting. The corrugated, or equivalent construction, described for member 33, provides the necessary compensation of contact, and contact pressures of the two or three pairs, as the case may be, of mating, annular metal-to-metal joints both as to initial contact when assembling and the contact pressure as it is effected by the relative pressures of the fluids in operation, as described.

While I have shown and described the specific construction of one form in which the invention may be embodied, it is obvious that the same is capable of various modifications within the scope of what is claimed without departing from the salient features of the invention.

I claim:

1. A tool-joint, comprising two units with mating threaded portions, the outer ends of each unit having three concentric sleeves adapted to be attached to the ends of three concentric pipe sections, the said tool-joint when assembled having a central bore and two annular series of passageways forming communication between the inner pipe sections and between the spaces separating the inner and intermediate pipe sections and between the spaces separating the intermediate and outer pipe sections, respectively, one of the units having a member forming a continuation of the intermediate sleeve, which member is positioned concentrically within a cylindrical bore in the companion member of the other unit when the tool-joint is assembled, an annular extremity of the companion member meeting the inner member at a shoulder and forming with it a pair of abutting, annular seats, and the two members having installed between them packing means adapted to press against the inner member and to press outwardly against the cylindrical bore of the companion member in a manner to prevent the flow of fluid between the two members while the two units of the tool-joint are being separated axially by the unscrewing of the threaded joint connecting them.

2. A tool-joint, comprising two units with mating threaded portions, the outer ends of each unit having three concentric sleeves adapted to be attached to the ends of three concentric pipe sections, the said tool-joint when assembled having a central bore and two annular series of passageways forming communication between the inner pipe sections and between the spaces separating the inner and intermediate pipe sections and between the spaces separating the intermediate and outer pipe sections, respectively, one of the units having a member forming a continuation of the intermediate sleeve, which member is positioned concentrically within a cylindrical bore in the companion member of the other unit when the tool-joint is assembled, an annular extremity of the companion member meeting the inner member at a shoulder and forming with it a pair of abutting, annular seats, the said companion member having a section provided with corrugations adapted to give the companion member flexibility to insure correct seating of the pair of abutting, annular seats as the threaded joint connecting the two units of the tool-joint is screwed up to its operating position in assembling the tool-joint.

3. A tool-joint comprising two units with mating threaded portions, the outer ends of each unit having three concentric sleeves adapted to be attached to the ends of three concentric pipe sections, the said tool-joint when assembled having a central bore and two annular series of passageways forming communication between the inner pipe sections and between the spaces separating the inner and intermediate pipe sections and between the spaces separating the intermediate and outer pipe sections, respectively, one of the units having a member forming a continuation of the intermediate sleeve, which member is positioned concentrically within a cylindrical bore in the companion member of the other unit when the tool-joint is assembled, an annular extremity of the companion member meeting the inner member at a shoulder and forming with it a pair of abutting, annular seats, the said companion member having a tubular section with its outer surface in communication with the passageways connecting the spaces between the outer and intermediate pipe sections and with its interior surface in communication with the passageways connecting the spaces between the intermediate and inner pipe sections, the said tubular section having a series of corrugations so proportioned with relation to the pair of abutting, annular seats aforesaid, and connected to the end of the said tubular section opposite the said annular seats at an annular section having an outside diameter smaller than the said annular seats and in such a manner that excess of pressure of fluid pressing upon the outer surface of said tubular section over the pressure of fluid pressing upon the interior surface of the same will deflect and extend the said tubular section and the series of corrugations axially and press the said pair of abutting, annular seats together with increasing pressure as the said excess of pressure of fluid increases.

4. A tool-joint, comprising two units with mating threaded portions, the outer ends of each unit having three concentric sleeves adapted to be attached to the ends of three concentric pipe sections, the said tool-joint when assembled having a central bore and two annular series of passageways forming communication between the inner pipe sections and between the spaces separating the inner and intermediate pipe sections and between the spaces separating the intermediate and outer pipe sections, respectively, one of the units having a member forming a continuation of the inner sleeve, which member is positioned concentrically within a cylindrical bore in the companion member of the other unit when the tool-joint is assembled, an annular extremity of the companion member meeting the inner member at a shoulder and forming with it a pair of abutting, annular seats, the said companion member having a section provided with corrugations adapted to give the companion member flexibility to insure correct seating of the pair of abutting, annular seats as the threaded joint connecting the two units of the tool-joint is screwed up to its operating position in assembling the tool-joint.

5. A tool-joint, comprising two units with mating threaded portions, the outer ends of each unit having three concentric sleeves adapted to be attached to the ends of three concentric pipe sections, the said tool-joint when assembled having a central bore and two annular series of passageways forming communication between the inner pipe sections and between the spaces separating the inner and intermediate pipe sections and between the spaces separating the intermediate and outer pipe sections, respectively, one of the units having a member forming a continuation of the inner sleeve, which member is positioned concentrically within a cylindrical bore in the companion member of the other unit when the tool-joint is assembled, an annular extremity of the companion member meeting the inner member at a shoulder and forming with it a pair of abutting, annular seats, the said companion member having a tubular section with its outer surface in communication with the passageways connecting the spaces between the inner and intermediate pipe sections and with its interior surface in communication with the central bore connecting the inner pipe sections, the said tubular section having a series of corrugations so proportioned with relation to the pair of abutting, annular seats aforesaid, and connected to the end of the said tubular section opposite the said annular seats at an annular section having an outside diameter smaller than the said annular seats and in such a manner that excess of pressure of fluid pressing upon the outer surface of said tubular section over the pressure of fluid pressing upon the interior surface of the same, will deflect and extend the said tubular section and the series of corrugations axially and press the said pair of abutting, annular seats together with increasing pressure as the said excess of pressure of fluid increases.

6. A tool-joint, comprising two units with mating threaded portions, the outer ends of each unit having three concentric sleeves adapted to be attached to the ends of three concentric pipe sections, the said tool-joint when assembled having a central bore and two annular series of passageways forming communication between the inner pipe sections and between the spaces separating the inner and intermediate pipe sections and between the spaces separating the intermediate and outer pipe sections, respectively, one of the units having a member forming a continuation of the intermediate sleeve, which member is positioned concentrically within a cylindrical bore in the companion member of the other unit when the tool-joint is assembled, an annular extremity of the companion member meeting the inner member at a shoulder and forming a pair of abutting, annular seats, and the two members having installed between them packing means adapted to bear inwardly against the inner member and outwardly against the cylindrical bore of the companion member as the two units of the tool-joint are being separated axially by the unscrewing of the threaded joint connecting them, and one of the units having a member forming a continuation of the inner sleeve, which member is positioned concentrically within a cylindrical bore in the companion member of the other unit when the tool-joint is assembled, an annular extremity of the companion member meeting the inner member at a shoulder and forming with it a pair of abutting, annular seats, the said companion member having a section provided with corrugations adapted to give the companion member flexibility to insure proper seating of the pair of abutting, annular seats aforesaid as the threaded joint connecting the two units of the tool-joint is screwed up to its operating position in assembling the tool-joint.

7. A tool-joint, comprising two units with mating threaded portions, the outer ends of each unit having three concentric sleeves adapted to be attached to the ends of three concentric pipe sections, the said tool-joint when assembled having a central bore and two annular series of passageways forming communication between the inner pipe sections and between the spaces separating the inner and intermediate pipe sections and between the spaces separating the intermediate and outer pipe sections, respectively, one of the units having a member forming a continuation of the intermediate sleeve, which member is positioned concentrically within a cylindrical bore in the companion member of the other unit when the tool-joint is assembled, and annular extremity of the companion member meeting the inner member at a shoulder and forming with it a pair of abutting, annular seats, the said companion member having a section provided with corrugations adapted to give the companion member flexibility to insure proper seating of the pair of abutting, annular seats aforesaid as the threaded joint connecting the two units of the tool-joint is screwed up to its operating position in assembling the tool-joint, and one of the units having a member forming a continuation of the inner sleeve, which member is positioned concentrically within a cylindrical bore in the companion member of the other unit when the tool-joint is assembled, an annular extremity of the companion member meeting the inner member at a shoulder and forming with it a pair of abutting, annular seats, the said companion member having a section provided with corrugations adapted to give the companion member flexibility to insure correct seating of the pair of abutting, annular seats aforesaid as the threaded joint connecting the two units of the tool-joint is screwed up to its operating position in assembling.

8. A tool-joint, comprising two units with mating threaded portions, the outer ends of each unit having three concentric sleeves adapted to be attached to the ends of three concentric pipe sections, the said tool-joint when assembled having a central bore and two annular series of passageways forming communication between the inner pipe sections and between the spaces separating the inner and intermediate pipe sections and between the spaces separating the intermediate and outer pipe sections, respectively, one of the units having a member forming a continuation of the intermediate sleeve, which member is positioned concentrically within a cylindrical bore in the companion member of the other unit when the tool-joint is assembled, an annular extremity of the companion member meeting the inner member at a shoulder and forming with it a pair of abutting, annular seats, the said companion member having a tubular section with its outer surface in communication with the passageways connecting the spaces between the outer and intermediate pipe sections and with its interior surface in communication with the passageways connecting the spaces between the intermediate and inner pipe sections, the said tubular section having a series of corrugations so proportioned with relation to the pair of abutting, annular seats aforesaid, and connected to the end of the said tubular section opposite the said annular seats at an annular section having an outside diameter smaller than the said annular seats and in such a manner that excess of pressure of fluid pressing upon the outer surface of said tubular section over the pressure of fluid pressing upon the interior surface of the same will deflect and extend the said tubular section and the series of corrugations axially and press the pair of abutting, annular seats together with increasing pressure as the said excess of pressure of fluid increases, and one of the units having a member forming a continuation of the inner sleeve, which member is positioned concentrically within a cylindrical bore in the companion member of the other unit when the tool-joint is assembled, an annular extremity of the companion member meeting the inner member at a shoulder and forming with it a pair of abutting, annular seats, the said companion member having a section provided with corrugations adapted to give the companion member flexibility to insure correct seating of the pair of abutting, annular seats as the threaded joint connecting the two units of the tool-joint is screwed up to its operating position in assembling the tool-joint.

9. A tool-joint, comprising two units with mating threaded portions, the outer ends of each unit having three concentric sleeves adapted to be attached to the ends of three concentric pipe sections, the said tool-joint when assembled having a central bore and two annular series of passageways forming communication between the inner pipe sections and between the spaces separating the inner and intermediate pipe sections and between the spaces separating the intermediate and outer pipe sections, respectively, one of the units having a member forming a continuation of the intermediate sleeve, which member is positioned concentrically within a cylindrical bore in the companion member of the other unit when the tool-joint is assembled, an annular extremity of the companion member meeting the inner member at a shoulder and forming with it a pair of abutting, annular seats, the two members having installed between them packing means adapted to continuously obstruct the flow of fluid between the two members as the two units of the tool-joint are being separated axially by the unscrewing of the threaded joint connecting them until the said joint is disengaged, the companion member having a section having a series of corrugations adapted to give flexibility to the said member to assist seating of the pair of abutting, annular shoulders, and one of the units having a member forming a continuation of the inner sleeve, which member is positioned concentrically within a cylindrical bore formed in the companion member of the other unit, the two units having installed between them when assembled packing means for preventing the flow of fluid between the two members.

IRVING C. HARRIS.